United States Patent [19]

Maykulsky

[11] Patent Number: 4,923,603
[45] Date of Patent: May 8, 1990

[54] COMBINED OIL FILTER AND COOLER

[76] Inventor: Joseph S. Maykulsky, 1400 Edgewood Way, #10, Oxnard, Calif. 93030

[21] Appl. No.: 303,291

[22] Filed: Jan. 30, 1989

[51] Int. Cl.⁵ .......................................... B01D 35/18
[52] U.S. Cl. ................................... 210/168; 210/186; 210/DIG. 17
[58] Field of Search ................. 55/268; 210/168, 184, 210/186, 232, DIG. 17, 416.5

[56] References Cited

U.S. PATENT DOCUMENTS

| | | | |
|---|---|---|---|
| 1,344,982 | 6/1920 | Brown | 210/168 X |
| 3,482,699 | 12/1969 | Kauffman et al. | 210/184 |
| 4,191,648 | 3/1980 | Kaplan et al. | 210/186 |
| 4,452,697 | 6/1984 | Conrad | 210/DIG. 17 X |

Primary Examiner—Charles Hart

[57] ABSTRACT

An improved oil filter and cooler comprising an oil filter cartridge having a jacket formed with a plurality of helical tubes circling about the exterior of a filter element and serving to gradually transport oil from the filter inlet port to the bottom of the jacket to provide cooling of said oil and allowing the oil to pass upwardly through said filter element to the filter outlet port.

7 Claims, 3 Drawing Sheets

COMBINED OIL FILTER AND COOLER

BACKGROUND

1. Field of Invention

This invention relates to automotive equipment and is particularly directed to combined oil filters and coolers.

2. Prior Art

Modern automotive engines tend to be made of light weight materials, such as aluminum, and to be designed to operate at high rates of revolution. Unfortunately, this combination causes the engine temperature to be quite high which tends to cause the lubricating oil to lose its viscosity and, hence, its ability to protect the engine against damage by friction and water. Ideally, the temperature of the motor oil should be kept below about 190° Fahrenheit. However, this value is often exceeded in modern automotive engines.

Because motor oil eventually becomes contaminated with sludge, metal particles and other debris, it is common practice to connect an oil filter in the oil line and to cause the oil to be circulated through the filter to remove the contaminants. Also, because of the heat problems, mentioned above, it is conventional to mount the oil filter in a position external to the engine to provide some degree of cooling as the oil passes through the filter. Unfortunately, with modern automotive engines, the flow rate of the oil through the engine is such that the dwell time of the oil in the filter is insufficient to adequately cool the oil. It has been proposed to overcome this problem by providing separate radiators for the oil. However, such radiators are quite expensive to install and maintain and require considerable redesigning of the oil flow system. Consequently, such radiators are found only as original equipment on very expensive automobiles and are not found on moderately priced cars or as retro-fit equipment. Thus none of the prior art oil filters and coolers have been entirely satisfactory.

A search in the U.S. Patent Office has revealed the following references:

| U.S. Pat. No. | INVENTOR | ISSUED |
| --- | --- | --- |
| 3,042,215 | F. R. Gruner | July 3, 1962 |
| 4,369,113 | J. Stifelman | Jan. 18, 1983 |
| 4,454,037 | R. H. Conterio et al | June 12, 1984 |

The patents to Gruner and Stifelman teach conventional oil filters, while the patent to Conterio relates to an insulating jacket for oil filters which may have utility in arctic conditions, but is the antithesis of the present invention.

BRIEF SUMMARY AND OBJECTS OF INVENTION

These disadvantages of the prior art are overcome with the present invention and a combined oil filter and cooler is provided which is simple and inexpensive to produce and install, requires no additional maintenance and no revision of the oil flow system and is equally useful on new cars, regardless of price, or as retro-fit equipment for older cars.

These advantages of the present invention are preferably attained by providing an improved oil filter and cooler comprising an oil filter cartridge having a jacket formed with a plurality of helical tubes circling about the exterior of a filter element and serving to gradually transport oil from the filter inlet port to the bottom of the jacket to provide cooling of said oil and allowing the oil to pass upwardly through said filter element to the filter outlet port.

Accordingly, it is an object of the present invention to provide improved means for filtering and cooling automotive oil.

Another object of the present invention is to provide improved means for filtering and cooling automotive oil which is inexpensive to produce, install and maintain and which does not require modifications of the oil flow system.

A further object of the present invention is to provide improved means for filtering and cooling automotive oil which is equally useful on new cars, regardless of price, or as retro-fit equipment on older cars.

A specific object of the present invention is to provide an improved oil filter and cooler comprising an oil filter cartridge having a jacket formed with a plurality of helical tubes circling about the exterior of a filter element and serving to gradually transport oil from the filter inlet port to the bottom of the jacket to provide cooling of said oil and allowing the oil to pass upwardly through said filter element to the filter outlet port.

These and other objects and features of the present invention will be apparent from the following detailed description, taken with reference to the figures of the accompanying drawing.

DETAILED DESCRIPTION OF THE INVENTION

Figure 1:
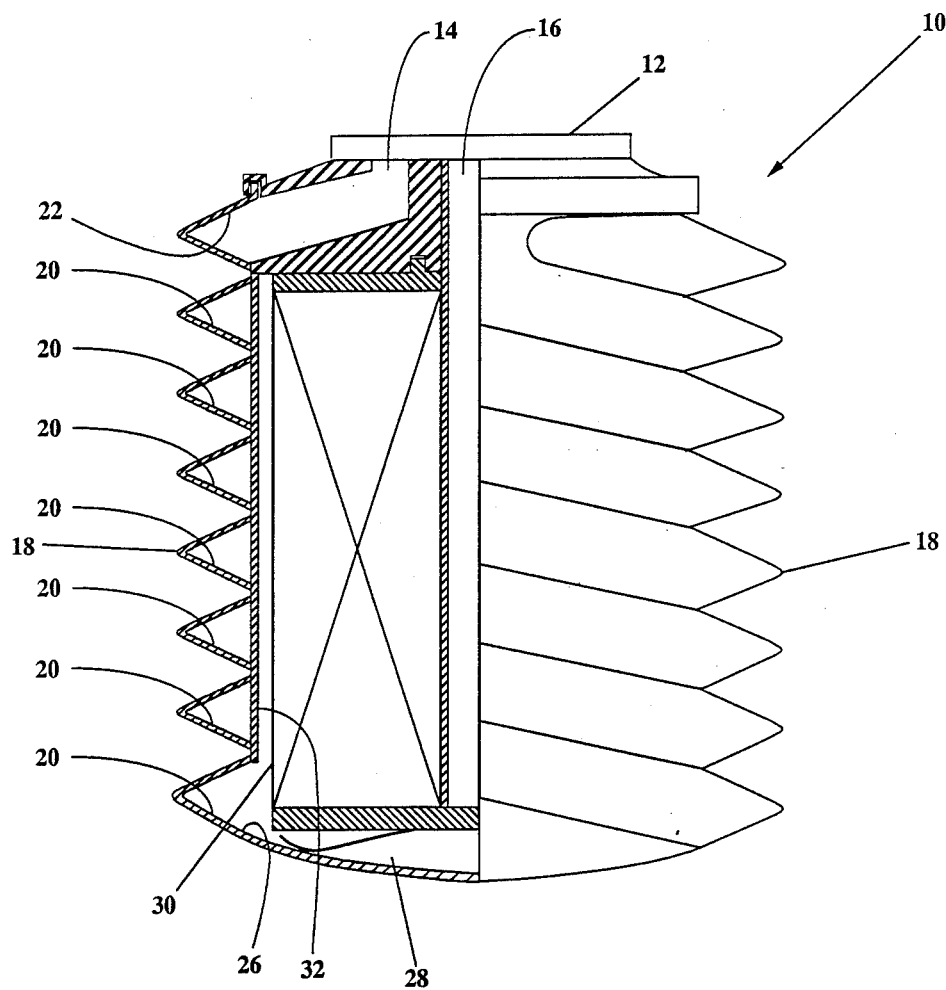
FIG. 1 is a side view, partly in section, of an oil filter and cooler embodying the present invention.

In that form of the present invention chosen for purposes of illustration in FIG. 1, a combination oil filter and cooler unit, indicated generally at 10, is s shown comprising a base portion 12 formed to mate with a conventional oil filter coupling, not shown, of an automobile or the like and having a plurality of oil inlet ports 14 spaced about the outer portion of the base portion 12 for receiving oil from the engine to be cleaned and a central oil outlet port 16 for returning cleaned oil to the engine oil system. An outer jacket 18 extends downwardly from the base portion 12 and is formed of material having a high heat transfer coefficient, such as thin metal, Also, the jacket 18 is configured to form a plurality of helical tubes or passageways 20 which wind downwardly from the base portion 12. At their upper ends 22, each of the helical passageways 20 connects with the base portion 12 and is open to receive oil form the inlet ports 14 of the base portion 12. At their lower ends 26, each of the passageways 20 opens into a sump 28 from whence the oil can flow upwardly through a suitable filter element 30 to pass out of the outlet port 16 and return to the engine oil system. An inner wall 32 defines the inner wall of the helical passageways 20 and prevents premature entry of the oil into the filter element 30.

In use, the combination oil filter and cooler unit 10 is installed on an automobile by connecting the base member 12 to the automotive oil system in the same manner as a conventional oil filter cartridge. When the engine is running, oil will flow through the engine's oil system and will pass through inlet ports 14 into the base portion 12 of the combination oil filter and cooler unit 10. Thereafter, the oil will flow into one or another of the helical passageways 20 and will flow helically downward inside of the jacket 18. Because the jacket 18 is formed of material having a high heat transfer coefficient, the heat carried by the oil can readily pass through the jacket 18 to be dissipated and, because the helical passageways 20 significantly extend the period when the oil is in contact with the jacket 18, the amount of heat removed from the oil by the unit 10 is substantial. When the oil reaches the bottom of the passageways 20, the oil passes into sump 28 and, thereafter, flows upward through the filter element 30 where it is cleaned. At the upper end of the filter element 30, the oil passes through outlet port 16 and is returned to the automotive oil system for recirculation through the engine. By causing the oil to flow through the helical passageways 20, the amount of heat removed from the oil is significantly increased over conventional oil filters and the effectiveness and life expectancy of the oil is greatly increased.

Figure 2:
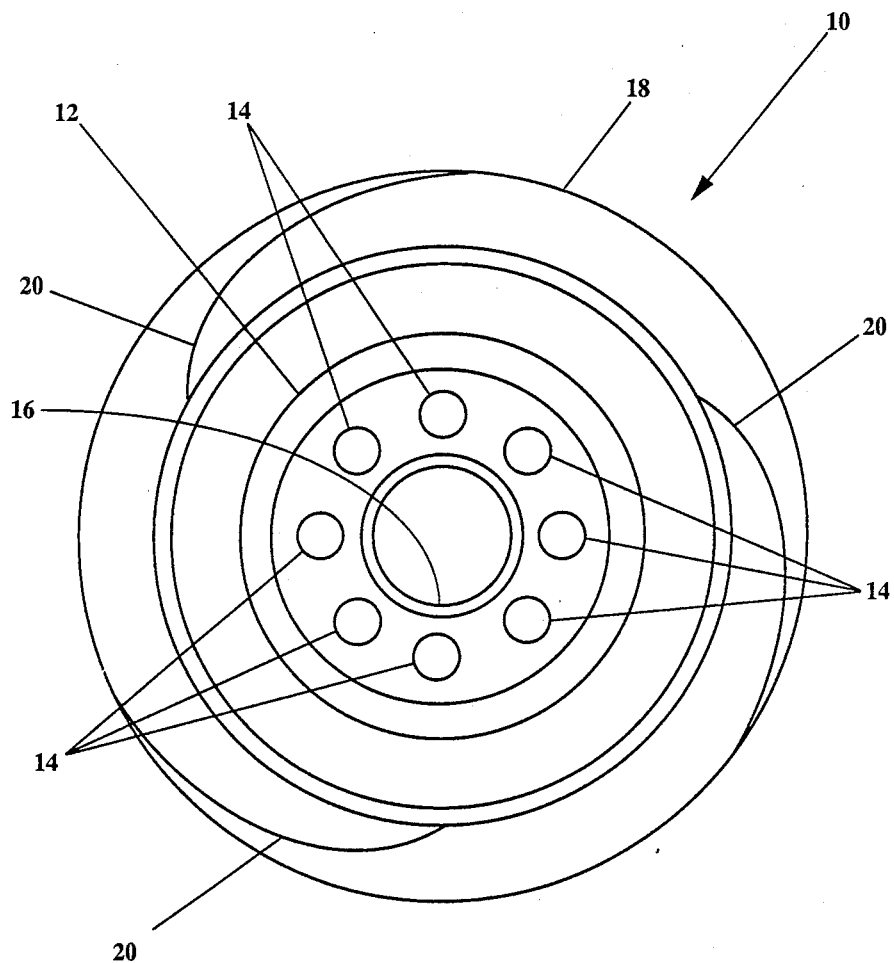
FIG. 2 is a top view of the oil filter of FIG. 1.
Figure 3:
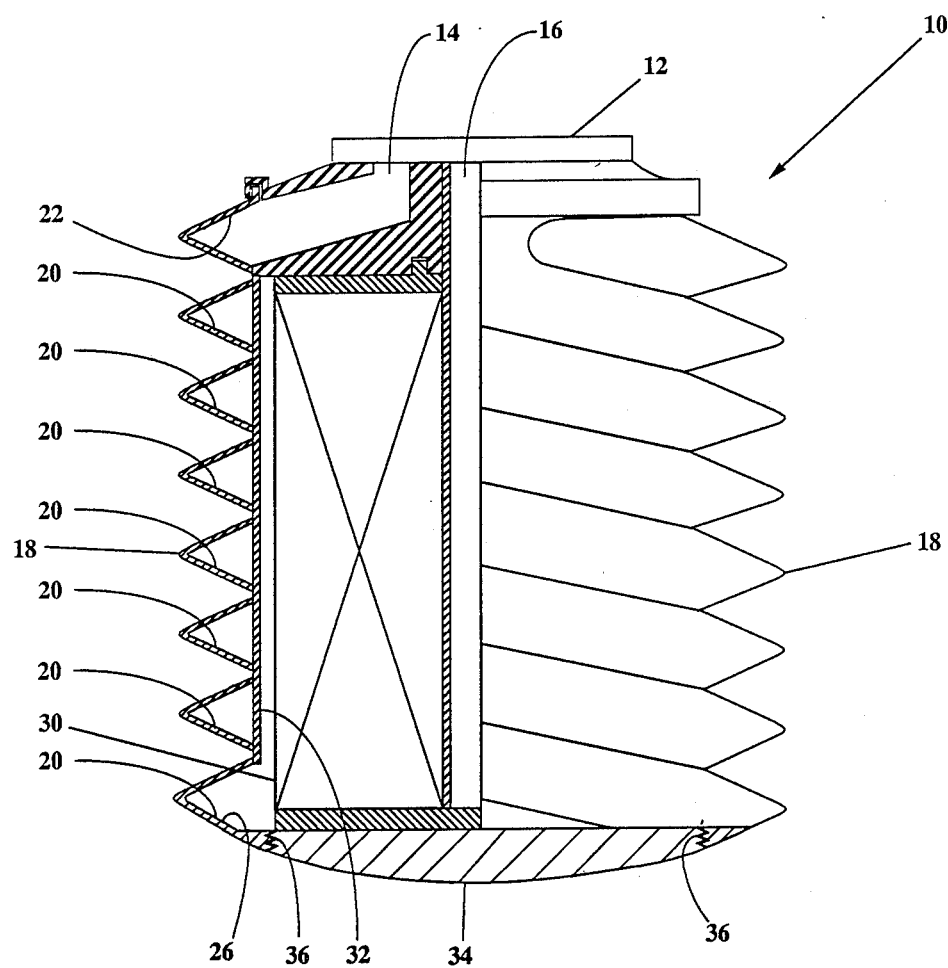
FIG. 3 is a view, similar to that of FIG. 1, through a modified form of the oil filter and cooler of FIG. 1.

In that form of the present invention shown in FIG. 1, the filter element 30 is an integral part of the unit 10. Thus, when the filter element 30 has become loaded with sludge and debris from the oil, the entire unit 10 is removed and replaced. As an alternative, FIG. 2 shows a modified form of the combination oil filter and cooler unit 10 wherein the filter element 30 is a separate member which may be removed and replaced independently. As seen in FIG. 2, the jacket 18 is provided with a removable bottom closure member 34 which is releasably secured to the jacket 18 by suitable means, such as threads 36. In lieu of the sump 28 of FIG. 1, a plurality of openings 38 are formed adjacent the lower end of the inner wall 32 to permit oil to flow from the lower ends of the passageways 20 into the bottom of the filter element 30 and thence upward to the outlet port 16 of the unit 10. With the structure of FIG. 2, when the filter element 30 has become loaded with sludge and debris from the oil, the closure member 34 may be unscrewed from the jacket 18 and the filter element 18 can be removed and replaced with a clean filter element 30, whereupon the closure member 34 may be rescrewed onto the jacket 18 and the oil cleaning and cooling operation can be resumed.

Obviously, numerous other variations and modifications can be made without departing from the spirit of the present invention. Therefore, it should be clearly understood that the forms of the present invention described above and shown in the figures of the accompanying drawings are illustrative only and are not intended to limit the scope of the present invention.

What is claimed is:

1. A combination oil filter and cooling unit comprising:
   a base member having coupling means for attaching said unit to an automotive oil system and formed with a central outlet port and a plurality of inlet ports,
   a jacket formed with a plurality of helical tubes circling about the exterior of a said unit and serving to gradually transport oil from the inlet ports of said base member to the bottom of the jacket to provide cooling of said oil, and
   a filter element mounted within said jacket connected to receive oil from the bottom of said jacket and to allowing said oil to pass upwardly through said filter element to the outlet port of said base member.

2. The unit of claim 1 wherein:
   said jacket is formed of material having a high heat transfer coefficient.

3. The unit of claim 1 wherein:
   said jacket is formed of thin metal.

4. The unit of claim 1 further comprising:
   sump means serving to receive oil from the bottom ends of said helical tubes and to deliver said oil to the bottom of said filter element for passage therethrough.

5. The unit of claim 1 further comprising:
   a closure member removably secured to the bottom of said jacket.

6. The unit of claim 5 wherein:
   said filter element is independent of said unit and is independently replaceable upon removal of said closure member.

7. The unit of claim 5 wherein:
   said closure member is threadedly secured to said jacket.

* * * * *